US008819579B2

(12) United States Patent
Sun et al.

(10) Patent No.: US 8,819,579 B2
(45) Date of Patent: Aug. 26, 2014

(54) METHOD FOR OPENING FILE ON VIRTUAL DESKTOP FOR CLOUD-BASED SYSTEM, THE SYSTEM AND COMPUTER READABLE STORAGE MEDIUM APPLYING THE METHOD

(75) Inventors: Jui-Hao Sun, Pingtung County (TW);
Yu-Wei Chuang, Taichung (TW);
Feng-Cheng Lin, Taipei (TW)

(73) Assignee: Institute For Information Industry, Taipei (TW)

( * ) Notice: Subject to any disclaimer, the term of this patent is extended or adjusted under 35 U.S.C. 154(b) by 6 days.

(21) Appl. No.: 13/314,205

(22) Filed: Dec. 8, 2011

(65) Prior Publication Data

US 2013/0117678 A1    May 9, 2013

(30) Foreign Application Priority Data

Nov. 9, 2011    (TW) .............................. 100140894 A

(51) Int. Cl.
*G06F 3/048*    (2013.01)
*G06F 9/50*    (2006.01)
*G06F 9/455*    (2006.01)

(52) U.S. Cl.
CPC . *G06F 9/455* (2013.01); *G06F 9/50* (2013.01)
USPC ......................................................... 715/784

(58) Field of Classification Search
USPC ................................................. 715/738, 764
See application file for complete search history.

(56) References Cited

U.S. PATENT DOCUMENTS

| | | | | |
|---|---|---|---|---|
| 2009/0300210 | A1* | 12/2009 | Ferris | 709/235 |
| 2010/0250712 | A1* | 9/2010 | Ellison et al. | 709/219 |
| 2010/0325422 | A1* | 12/2010 | Gnanasambandam et al. | 713/153 |
| 2011/0055398 | A1* | 3/2011 | Dehaan et al. | 709/226 |
| 2011/0184993 | A1* | 7/2011 | Chawla et al. | 707/802 |
| 2011/0231280 | A1* | 9/2011 | Farah | 705/26.8 |
| 2011/0296000 | A1* | 12/2011 | Ferris et al. | 709/224 |
| 2011/0307780 | A1* | 12/2011 | Harris et al. | 715/708 |
| 2012/0131173 | A1* | 5/2012 | Ferris et al. | 709/224 |

* cited by examiner

*Primary Examiner* — William Bashore
*Assistant Examiner* — Rayeez Chowdhury
(74) *Attorney, Agent, or Firm* — CKC & Partners Co., Ltd.

(57) ABSTRACT

A method for opening a file on a virtual desktop for a cloud-based system includes the following steps: The at least one external cloud server does not belong to the cloud-based system. A virtual desktop is provided to a client. The client displays the virtual desktop by a browser. An open-file request for opening a target file is received through the virtual desktop. A corresponding application service, which is utilized for opening the target file, is searched among the external application services. When the target file is an internal file stored in the cloud-based system and the corresponding application service is provided by the at least one external cloud server, the at least one external cloud server is driven to provide the corresponding application service for opening the target file, and the opened target file is displayed on the virtual desktop of the client.

7 Claims, 4 Drawing Sheets

METHOD FOR OPENING FILE ON VIRTUAL DESKTOP FOR CLOUD-BASED SYSTEM, THE SYSTEM AND COMPUTER READABLE STORAGE MEDIUM APPLYING THE METHOD

RELATED APPLICATIONS

This application claims priority to Taiwan Application Serial Number 100140894, filed Nov. 9, 2011, which is herein incorporated by reference.

BACKGROUND

1. Technical Field

The present invention relates to a method for opening file on virtual desktop for a cloud-based system, the system and a computer-readable storage medium with a computer program to execute the method. More particularly, the present invention relates to a method for utilizing files and applications on virtual desktop for a cloud-based system to cross other cloud-based systems, the cloud-based system and a computer-readable storage medium with a computer program to execute the method.

2. Description of Related Art

In the past few years, users interfaces of computers changes a lot. User interfaces in the early years provide a command line interface to executing application programs according to character commands input by users. In subsequence, Graphical User Interface (GUI) is developed and provides a user-friendly interface through graphical icons.

Recently, virtual desktop computing is very popular. Users can store their data and application in remote computers, and the stored data and application can be accessed from any computer through a virtual desktop. As a result, users own virtual computers carried with them.

By the same time, cloud computing which means compute by utilizing network resources has become very popular. Utilizing cloud computing, resources can be provided dynamically and can be expanded easily. Several virtual services, such as cloud file-storage service and cloud application service have been provided. However, it is not easy to integrate cloud-based resources for providing virtual desktops and other external cloud-based resources, which may provide poor user experience.

SUMMARY

According to one embodiment of this invention, a method for opening a file on a virtual desktop is provided to provide a virtual desktop by a cloud-based system. The method for opening a file on a virtual desktop includes the following steps: at least one external cloud server is driven to provide several external application services, wherein the at least one external cloud server does not belong to the cloud-based system; a virtual desktop is provided to a client, wherein the client displays the virtual desktop by a browser; a open-file request for opening a target file through the virtual desktop is received; a corresponding application service, which is utilized for opening the target file, is searched among the external application services; and when the target file is an internal file stored in the cloud-based system and the corresponding application service is provided by the at least one external cloud server, the at least one external cloud server is driven to provide the corresponding application service for opening the target file, and the opened target file is displayed on the virtual desktop of the client.

According to another embodiment of this invention, a computer-readable storage medium storing a computer program for executing the steps of the aforementioned method for opening a file on a virtual desktop is provided. Steps of the method are as disclosed above.

According to another embodiment of this invention, a cloud-based system for opening a file on a virtual desktop is provided. The cloud-based system includes a service driving module, a virtual-desktop providing module, a request receiving module, a searching module and a file management module. The service driving module drives several external application services provided by at least one external cloud server. The at least one external cloud server does not belong to the cloud-based system. The virtual-desktop providing module provides a virtual desktop to a client. The client displays the virtual desktop by a browser. The request receiving module receives a open-file request for opening a target file through the virtual desktop. The searching module searches a corresponding application service, which is utilized for opening the target file, among the external application services. When the target file is an internal file stored in the cloud-based system and the corresponding application service is provided by the at least one external cloud server, the file management module drives the service driving module to activate the at least one external cloud server to provide the corresponding application service for opening the target file, and displaying the opened target file on the virtual desktop of the client.

Furthermore, in the above mentioned method and system, if the target file is the internal file and the corresponding application service is provided by the at least one external cloud server, the corresponding application service provided by the at least one external cloud server may be authorized to access the target file. After authorized, the at least one external cloud server is driven to provide the corresponding application service for opening the target file. Subsequently, the opened target file is displayed on the virtual desktop of the client.

Moreover, in the above mentioned method and system, several internal application services may be provided, and the corresponding application service, which is utilized for opening the target file, may be searched among the external application services and the internal application services. If the target file is provided by the at least one external cloud server and the corresponding application service is one of the internal application services, the corresponding application service among the internal application services is invoked for opening the target file, and the opened target file is displayed on the virtual desktop of the client.

In addition, if the target file is an external file provided by the at least one external cloud server and the corresponding application service is provided by a second external cloud server, the second external cloud server is driven to provide the corresponding application service to open the target file, and the opened target file is displayed on the virtual desktop of the client.

The present invention can achieve many advantages. Even if an application service desired to be provided is from the cloud-based system or an external cloud server or a file desired to be opened is stored in the cloud-based system or an external cloud server, a user of a client can still open the file on its virtual desktop. As a result, resources of the cloud-based system, which provides the virtual desktop, and the external resources provided by the external cloud server can be utilized with efficiency.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
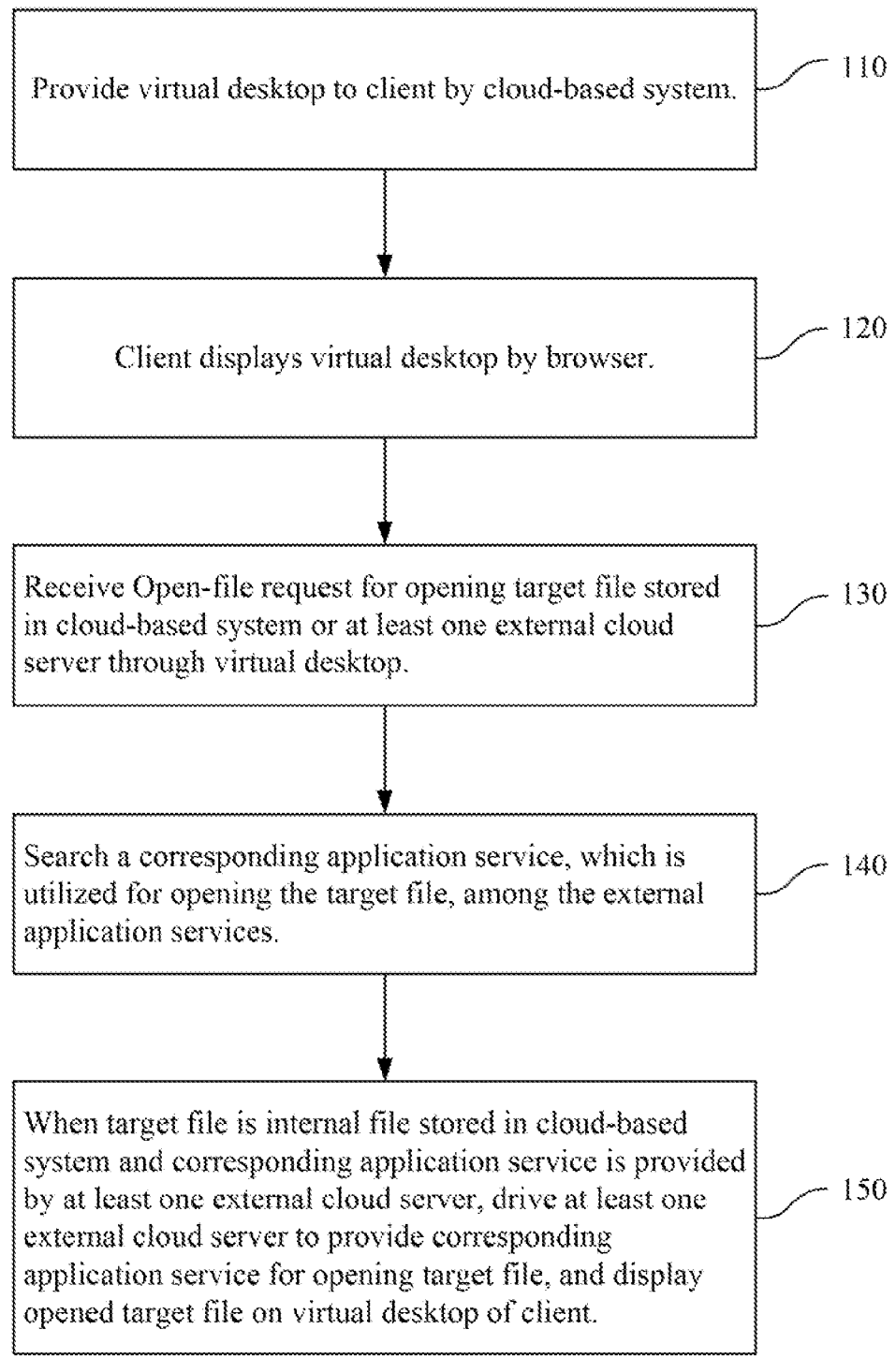
FIG. 1 is a flow diagram of a method for opening a file on a virtual desktop according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a method for opening a file on a virtual desktop according to one embodiment of this invention. In the method, a virtual desktop is provided by a cloud-based system. An application service or files can be provided by an external cloud server other than the cloud-based system, and the files stored in the cloud-based system or the external cloud server can be opened through the cloud-based system or the external cloud server. The method may take the form of a computer program product stored on a computer-readable storage medium having computer-readable instructions embodied in the medium. Any suitable storage medium may be used. In some embodiments, such suitable storage medium may be a non-transitory computer readable storage medium including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. In other embodiments, other suitable storage mediums may be used, which should not be limited in this disclosure.

The routine 100 for the method for opening file on virtual desktop starts at operation 110, where a virtual desktop is provided to a client by a cloud-based system. In general, the cloud-based system may provide several internal application services, or connects to at least one external cloud server to obtain several external application services. The at least one external cloud server does not belong to servers of the cloud-based system. The cloud-based system may drive the external cloud server to provide several external application services.

In addition, the cloud-based system may provide the virtual desktop to the client through a virtual desktop interface (VDI)

The routine 100 continues to operation 120, where the client displays the virtual desktop by a browser. In some embodiments, the virtual desktop provided at operation 110 may follow a format suitable for the browser for the virtual desktop. Therefore, the virtual desktop can be displayed by the browser which is available in several operation systems (OSs). In other words, the display of the virtual desktop can be applied to clients with different OS. Subsequently, a user of the client can operate the virtual desktop of the client.

The routine 100 continues to operation 130, where if a user of the client wants to open a target file on the virtual desktop, a corresponding open-file request may be generated, and the cloud-based system receives the open-file request for opening the target file, which is stored in the cloud-based system or at least one external cloud server, through the virtual desktop. The target file may be taken as an internal file if the target file is stored in the cloud-based system, and the target file may be taken as an external file if the target file is stored in the external cloud server.

The routine 100 continues to operation 140, where a corresponding application service, which is utilized for opening the target file, is searched among the internal application services and the external application services.

In some embodiments, information of the internal application services, which the cloud-based system can provide, and information of the external application services, which the external cloud server can provide, may be obtained in advance for searching at operation 140. In addition, if more than one corresponding application services are searched, information of the same may be displayed on the virtual desktop of the client, such that a user of the client can select from the same.

In some embodiments of operation 140, the corresponding application service, which is utilized for opening the target file, can be searched only from the external application services. In some other embodiments of operation 140, the corresponding application service, which is utilized for opening the target file, can be searched only from the internal application services.

The routine 100 continues to operation 150, where when the target file is an internal file stored in the cloud-based system and the corresponding application service is provided by the at least one external cloud server, the at least one external cloud server is driven to provide the corresponding application service for opening the target file, and the opened target file is displayed on the virtual desktop of the client.

In another embodiment of this invention, at operation 150, if the target file is an external file provided by the at least one external cloud server and the corresponding application service is an internal application service provided by the cloud-based system, the corresponding internal application service is invoked to open the target file, and then the opened target file can be displayed on the virtual desktop of the client.

In one embodiment of this invention, image streaming of the opened target file can be transmitted to the client for the client to display the opened target file. Therefore, even if an application service desired to be provided is from the cloud-based system or an external cloud server or a file desired to be opened is stored in the cloud-based system or an external cloud server, a user of the client can still open the file on the virtual desktop of the client. As a result, resources of the cloud-based system, which provides the virtual desktop, and the external resources provided by the external cloud server can be utilized with efficiency.

In one embodiment, before opening target file by the corresponding application service (operation 150), determine that the target file is stored in the one selected from which of the cloud-based system and the at least one external cloud server, and determine that corresponding application service is provided by which of the cloud-based system and the least one external cloud server. Subsequently, the routine 100 can continue to operation 150 to opening the target file according to the result thereof.

In another embodiment of this invention, authorization may be further performed at operation 150. If the target file is an internal file stored in the cloud-based system and the corresponding application service is provided by the at least one external cloud server, the corresponding application service provided by the at least one external cloud server can be authorized to access the target file stored in the cloud-based system. In some embodiments, such authorization can be performed with Open Authorization (OAuth) or other authorization methods. Hence, after authorized, the authorized target file can be opened with the corresponding application service provided by the at least one external cloud server. In some embodiments, the corresponding application service may utilize representational state transfer (RESTful) Application Programming Interface (API) to connect to a file-storage service of the external cloud server for opening the target file. Therefore, with the authorization mentioned above, the target file, which is stored in the file-storage service provided by the external cloud server, can be opened by the corresponding application service, which is provided by the external cloud server.

In another embodiment of authorization operation, if the target file is stored in the external cloud server and the corresponding application service is provided by the cloud-based system, which provides the virtual desktop, (an internal application service), authorization for accessing the target file can be obtained from the external cloud server, the internal application service can be invoked for accessing the authorized target file, and then the opened target file can be displayed on the virtual desktop of the client. In another embodiment, the target file can be obtained from the external cloud server and be stored in an internal folder of the cloud-based system. Subsequently, the internal folder can be mounted for the corresponding application service to access. Hence, the corresponding application service can be invoked to open the target file stored in the mounted internal folder, and the opened target file can be displayed on the virtual desktop of the client. Therefore, the file stored in the external cloud server can be opened as a file stored in the cloud-based system, which provides the virtual desktop.

In another embodiment for operation 150, if the target file is an external file provided by one external cloud server (or called a first external cloud server) and the corresponding application service is provided by another external cloud server (named as a second external cloud server), the second external cloud server is driven to provide the corresponding application service to open the target file stored in the first external cloud server. Then, the opened target file can be displayed on the virtual desktop of the client. In this embodiment, an authorization operation may be included to obtain an authorization for the corresponding application service provided by the second external cloud server to access the target file stored in the first external cloud server. In some embodiments, such authorization can be performed with Open Authorization (OAuth) or other authorization methods. Subsequently, after authorized, the authorized target file can be transmitted to the second external cloud server for opening by the corresponding application service, and the opened target file can be displayed on the virtual desktop of the client. Therefore, files stored in one external cloud server can be opened by application services provided by another external cloud server.

Furthermore, when the target file is stored in the cloud-based system and the corresponding application service is provided by the same cloud-based system, an internal folder for storing the target file can be mounted for the corresponding application service to access. Subsequently, the target file stored in the mounted internal folder can be opened through the corresponding application service, and the opened target file can be displayed on the virtual desktop of the client. Therefore, the cloud-based system can open the target file stored by the same through the corresponding application service provided by the same on the virtual desktop.

Figure 2:
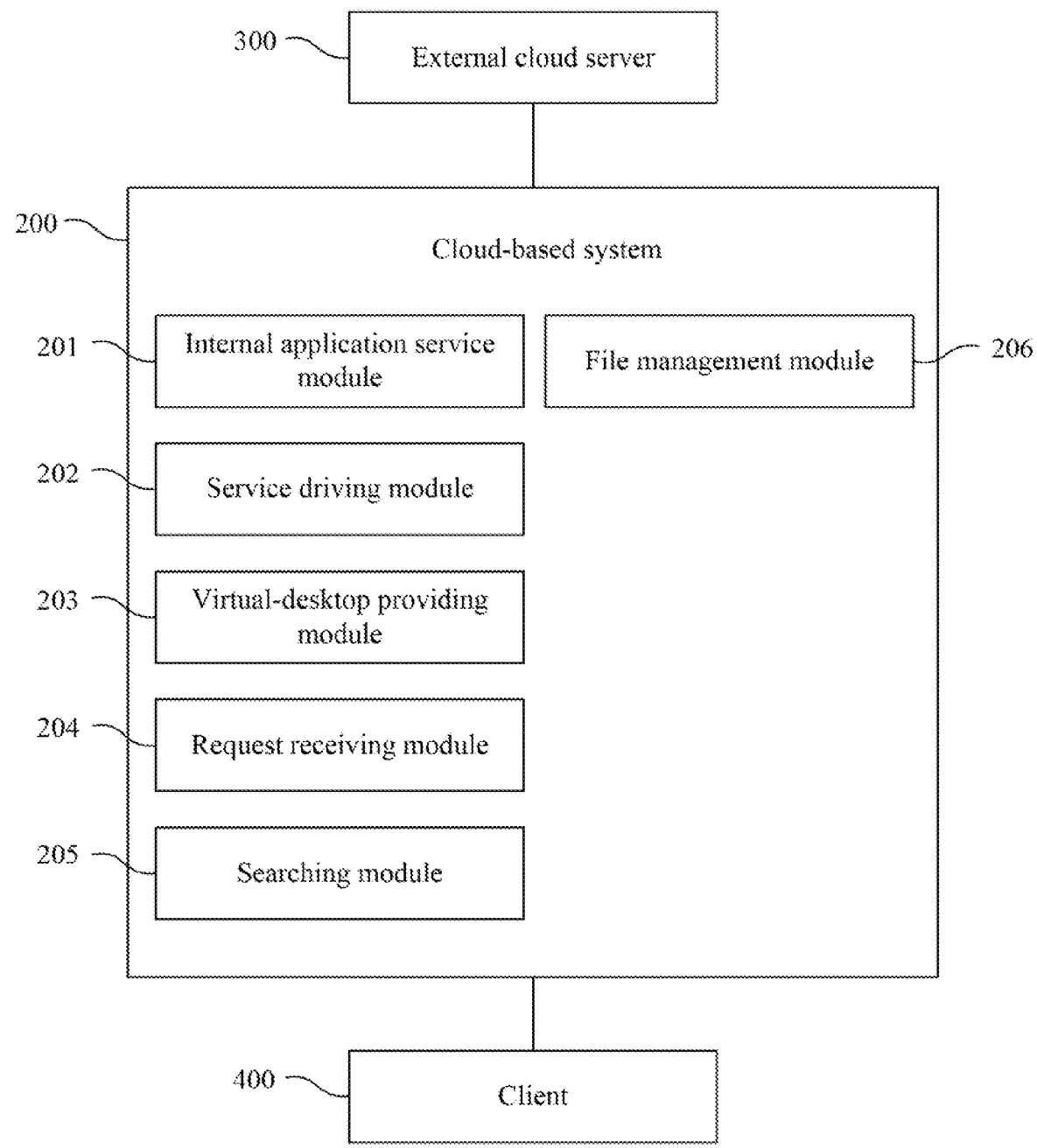
FIG. 2 illustrates a block diagram of a cloud-based system for opening a file on a virtual desktop according to an embodiment of this invention.

Referring to FIG. 2, a block diagram will be described that illustrates a cloud-based system for opening a file on a virtual desktop according to an embodiment of this invention. The cloud-based system provide a virtual desktop to a client, and when an application service or files are provided by an external cloud server other than the cloud-based system, files stored in the cloud-based system or the external cloud server is opened through the cloud-based system or the external cloud server.

The cloud-based system 200 mainly includes a service driving module 202, a virtual-desktop providing module 203, a request receiving module 204, a searching module 205 and a file management module 206. In some embodiments, the cloud-based system 200 may further include an internal application service module 201 to provide several internal application services. The service driving module 202 drives the internal application services and several external application services provided by at least one external cloud server 300. The at least one external cloud server 300 does not belong to the cloud-based system 200. The virtual-desktop providing module 203 provides a virtual desktop to a client 400. The client 400 displays the virtual desktop by a browser. In one embodiment of this invention, the cloud-based system 200 and the client 400 may be provided with the same physical machine. In another embodiment of this invention, the cloud-based system 200 and the client 400 may be provided with different physical machines. If the cloud-based system 200 and the client 400 are provided with different physical machines, the client 400 may build a connection with the cloud-based system 200. Hence, the virtual-desktop providing module 203 may provide the virtual desktop to the client 400 through the network.

After the virtual desktop is provided to the client 400, a user of the client 400 can operate the virtual desktop of the client 400. If a user of the client 400 wants to open a target file on the virtual desktop, a corresponding open-file request may be generated, and the request receiving module 204 receives the open-file request for opening the target file, which is stored in the cloud-based system 200 or the at least one external cloud server 300, through the virtual desktop.

The searching module 205 searches a corresponding application service, which is utilized for opening the target file, among the external application services. In some embodiments, the cloud-based system 200 may obtain information of the internal application services, which the cloud-based system 200 can provide, and information of the external application services, which the external cloud server 300 can provide, in advance for the searching module 205. In some embodiments, the searching module 205 may search the corresponding application service, which is utilized for opening the target file, from the external application services. In some other embodiments, the searching module 205 may search the corresponding application service, which is utilized for opening the target file, only from the internal application services When the corresponding application service is provided by the at least one external cloud server 300 or the target file is stored in the at least one external cloud server 300, the file management module 206 drives the service driving module 202 to activate the corresponding application service for opening the target file, and the opened target file is displayed on the virtual desktop of the client 400. In one embodiment of this invention, the file management module 206 may transmit image streaming of the opened target file to the client 400 for the client 400 to display the opened target file. Therefore, even if an application service desired to be provided is from the cloud-based system 200 or an external cloud server 300 or a file desired to be opened is stored in the cloud-based system 200 or an external cloud server 300, a user of the client 400 can still open the file on the virtual desktop of the client 400. As a result, resources of the cloud-based system 200, which provides the virtual desktop, and the external resources provided by the external cloud server 300 can be utilized with efficiency.

In one embodiment, if the target file is an internal file stored in the cloud-based system 200 and the corresponding application service is provided by the external cloud server 300, the file management module 206 may utilize the service driving module 202 to drive the external cloud server 300 to provide the corresponding application service for opening the target file. In another embodiment of this invention, if the target file is stored in the external cloud server 300 and the corresponding application service is an internal application service provided by the cloud-based system 200, the file management module 206 invokes the corresponding application service for opening the target file. In still another embodiment, if the target file is stored in one first external cloud server and the corresponding application service is provided by a second external cloud server, the file management module 206 utilizes the service driving module 202 to drive the second external cloud server to provide the corresponding application service for opening the target file.

Figure 3:
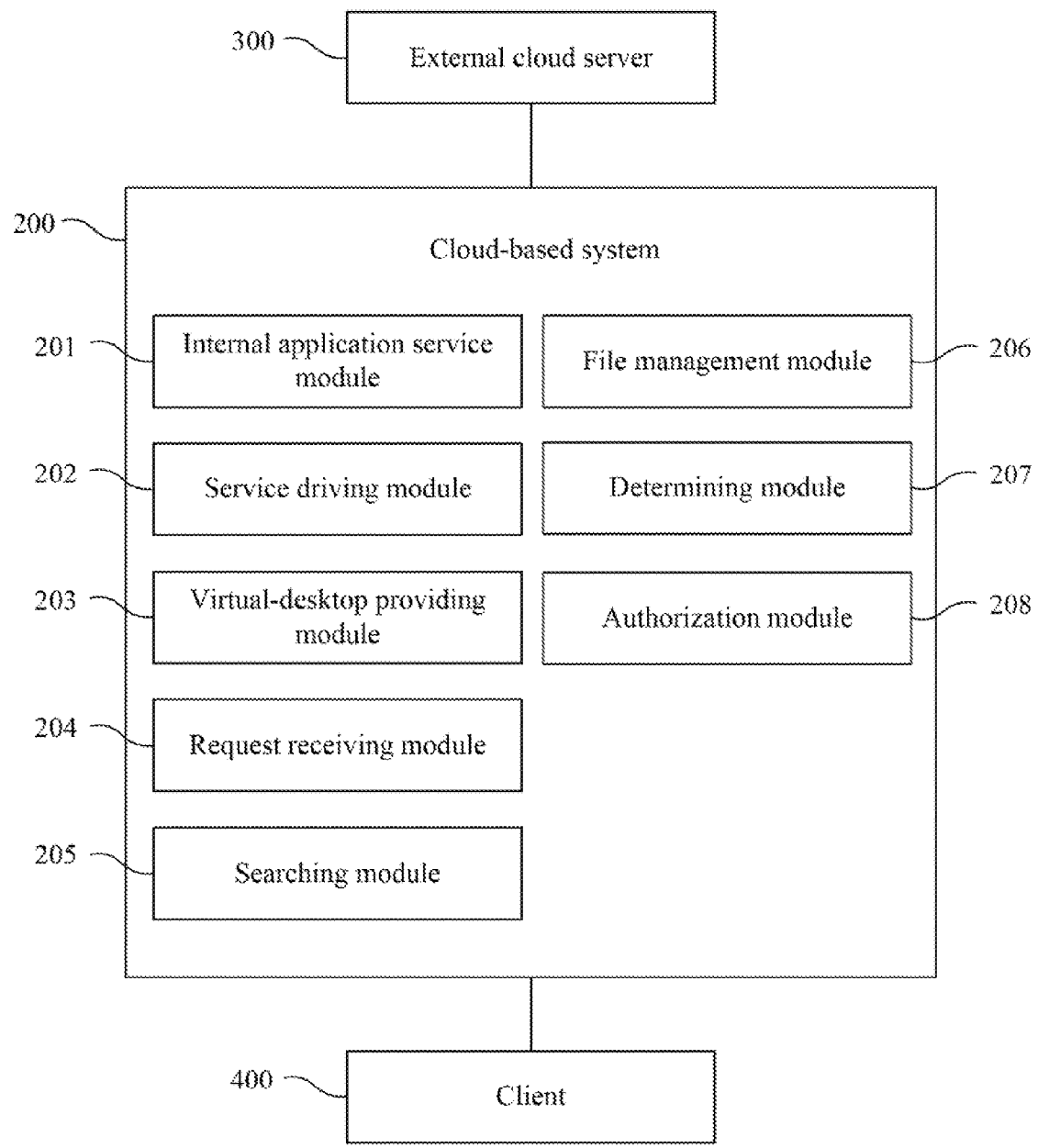
FIG. 3 illustrates a block diagram of a cloud-based system for opening a file on a virtual desktop according to another embodiment of this invention.

Referring to FIG. 3, a block diagram will be described that illustrates a cloud-based system for opening a file on a virtual desktop according to another embodiment of this invention. It is to be understood that aspects of this embodiment similar to those described with reference to FIG. 2 may not be repeated.

The cloud-based system 200 may further include a determining module 207 and an authorization module 208. The determining module 207 determines that the target file is stored in which of the cloud-based system 200 and the at least one external cloud server 300, and determines that corresponding application service is provided by which of the cloud-based system 200 and the least one external cloud server 300.

In one embodiment, if the determining module 207 determines that the target file is store in the external cloud serve 300 and the corresponding application service is also provided by the external cloud serve 300, the authorization module 208 may authorize the corresponding application service provided by the external cloud serve 300 to access the target file stored in the external cloud serve 300. In some embodiments, the authorization module 208 authorizes with Open Authorization (OAuth) or other authorization methods. In addition, the corresponding application service may utilize RESTful API to connect to a file-storage service of the external cloud server 300 for opening the target file. Hence, after authorized, the service driving module 202 can utilize the corresponding application service to open the target file, and the opened target file can be displayed on the virtual desktop of the client 400. Therefore, with the authorization module 208, the target file, which is stored in the file-storage service provided by the external cloud server 300, can be opened by the corresponding application service, which is provided by the external cloud server 300.

In another embodiment of this invention, if the determining module 207 determines that the target file is stored in the cloud-based system 200 and the corresponding application service is provided by the external cloud serve 300, the authorization module 208 may authorize the corresponding application service (provided by the external cloud serve 300) to access the target file stored in the cloud-based system 200. Hence, after authorized, the service driving module 202 transmits the target file to the external cloud serve 300 for the corresponding application service to open, and the opened target file can be displayed on the virtual desktop of the client 400. Therefore, the file stored in the cloud-based system 200 can be opened through the application service provided by the external cloud server 300.

Figure 4:
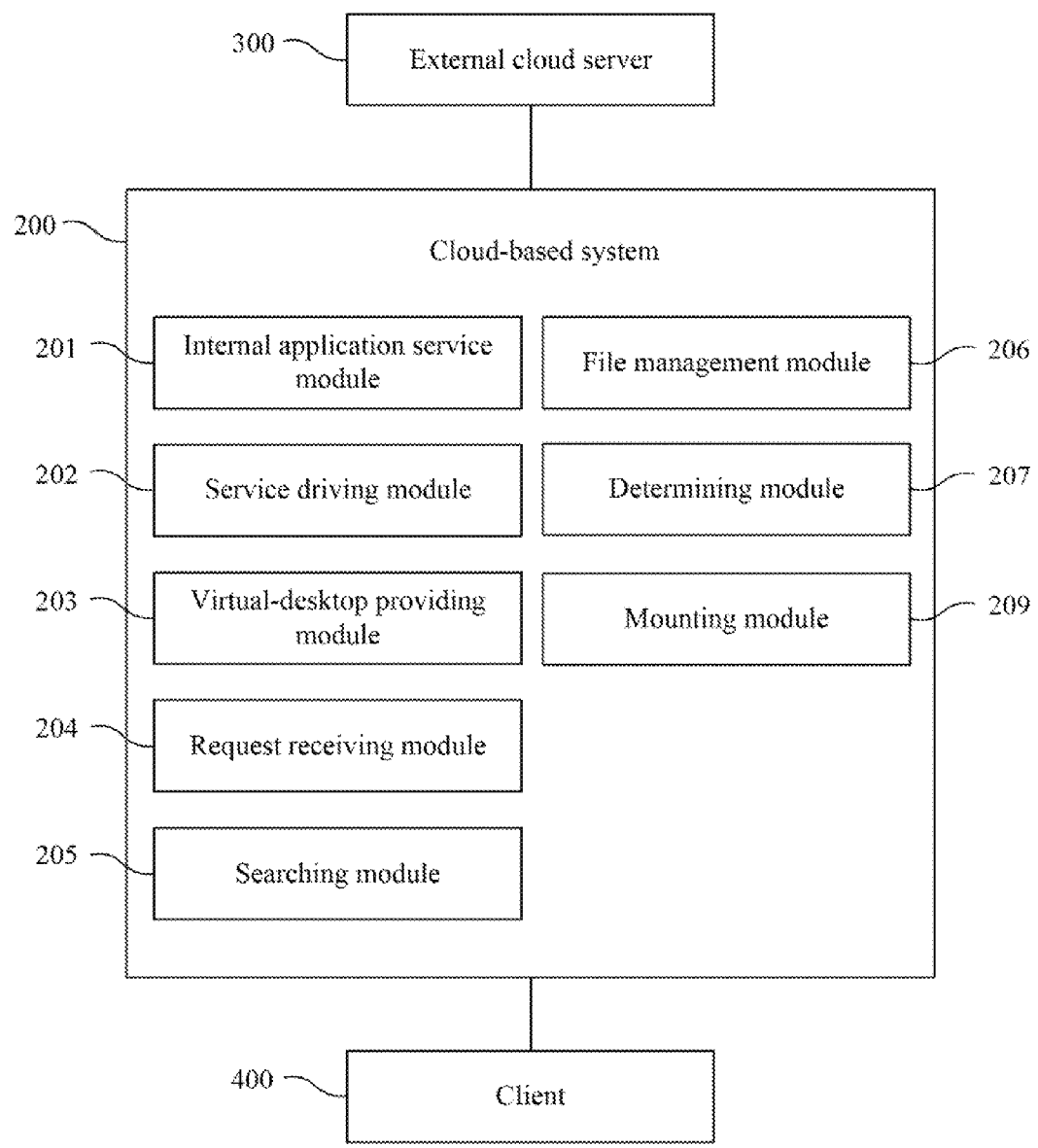
FIG. 4 illustrates a block diagram of a cloud-based system for opening a file on a virtual desktop according to still another embodiment of this invention.

Referring to FIG. 4, a block diagram will be described that illustrates a cloud-based system for opening a file on a virtual desktop according to still another embodiment of this invention. It is to be understood that aspects of this embodiment similar to those described above may not be repeated.

The cloud-based system 200 may further include a determining module 207 and a mounting module 209. In one embodiment of this invention, if the determining module 207 determines that the target file is stored in the external cloud server 300 and the corresponding application service is provided by the cloud-based system 200, the mounting module 209 may obtain the target file from the cloud server 300. Subsequently, the mounting module 209 may store the target file obtained in an internal folder of the cloud-based system 200, and may mount the internal folder for the corresponding application service to access. Hence, the service driving module 202 can open the target file stored in the mounted internal folder with the corresponding application service provided by the cloud-based system 200. In subsequence, the cloud-based system 200 can provide the image streaming of the opened target file on the virtual desktop to the client 400 for display. Therefore, the file stored in the external cloud server 300 can be opened as a file stored in the cloud-based system 200, which provides the virtual desktop.

In another embodiment of this invention, if the determining module 207 determines that the target file is stored in the cloud-based system 200 and the corresponding application service is also provided by the same cloud-based system 200, the mounting module 209 mounts an internal folder of the cloud-based system, which stores the target file, for the corresponding application service to access. In subsequence, the service driving module 202 can open the target file stored in the mounted internal folder with the corresponding application service provided by the cloud-based system 200. Therefore, the cloud-based system 200 can open the target file stored by the same through the corresponding application service provided by the same on the virtual desktop.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for opening a file on a virtual desktop for a cloud-based system, wherein the method comprises:
   driving a plurality of external application services provided by at least one external cloud server, wherein the at least one external cloud server does not belong to the cloud-based system;
   providing a virtual desktop to a client by the cloud-based system, wherein the client displays the virtual desktop by a browser;
   receiving a open-file request for opening a target file through the virtual desktop;
   Searching at least one corresponding application service, which is utilized for opening the target file, from among the plurality of the external application services;
   determining if the target file is stored in of the cloud-based system and the at least one external cloud server; and
   determining if the corresponding application service is provided by one of the cloud-based system and the least one external cloud server;
   when the target file is an internal file stored in the cloud-based system and the corresponding application service is provided by the at least one external cloud server, authorizing the corresponding application service provided by the at least one external cloud server to access the target file, driving the at least one external cloud server to provide the corresponding application service for opening the target file after authorized, and displaying the opened target file on the virtual desktop of the client;
   wherein a plurality of corresponding application services, each of which is utilized for opening the target file, are searched from among the external application services and the method further comprises:
   displaying information of the searched corresponding application services on the virtual desktop of the client, such that a user of the client can select from among the searched corresponding application services.

2. The method of claim 1 further comprising: providing a plurality of internal application services by the cloud-based system;
   searching the corresponding application service, which is utilized for opening the target file, among the external application services and the internal application services; and
   if the target file is provided by the at least one external cloud server and the corresponding application service is one of the internal application services, invoking the corresponding application service among the internal application services for opening the target file, and displaying the opened target file on the virtual desktop of the client.

3. The method of claim 2 further comprising:
   if the target file is the internal file and the corresponding application service is provided by the at least one external cloud server, authorizing the corresponding application service provided by the at least one external cloud server to access the target file and driving the at least one external cloud server to provide the corresponding application service for opening the target file after authorized; and
   if the target file is an external file provided by the at least one external cloud server and the corresponding application service is an internal application service provided by the cloud-based system, obtaining an authorization for accessing the target file from the at least one external cloud server, invoking the corresponding internal application service to open the target file with the accessing authorization, and displaying the opened target file on the virtual desktop of the client.

4. The method of claim of 1 further comprising: if the target file is stored in the at least one external cloud server and the corresponding application service is provided by the cloud-based system, obtaining the target file from the at least one external cloud server; storing the obtained target file in an internal folder of the cloud-based system, mounting the internal folder for the corresponding application service to access; and
   invoking the corresponding application service to open the target file stored in the mounted internal folder; and displaying the opened target file on the virtual desktop of the client.

5. The method of claim: 1 further comprising: if the target file is an external file provided by the at least one external cloud server and the corresponding application service is provided by a second external cloud server, driving the second external cloud server to provide the corresponding application service to open the target file, and displaying the opened target file on the virtual desktop of the client.

6. The method of claim 5 further comprising: if the target file is stored in the cloud-based system: and the corresponding application service is provided by the at least one external cloud server, authorizing the corresponding application service provided by the at least one external cloud server to access the target file, and driving the at least one external cloud server to provide the corresponding application service to open the authorized target file after authorizing; and
   if the target file is an external file stored in the at least one external cloud sewer and the corresponding application service is provided by a second external cloud server, obtaining an authorization for accessing the target file from the at least one external cloud server, and driving the second external cloud server to provide the corresponding application service to open the target file with the authorization after the authorization, and displaying the opened target file on the virtual desktop of the client.

7. A non-transitory computer readable storage medium: with a computer program to execute a method for opening a file on a virtual desktop for a cloud-based system, wherein the method comprises:
   driving a plurality of external application services provided by at least one external cloud server, wherein the at least one external cloud server does not belong to the cloud-based system; providing a virtual desktop to a client by the cloud-based system, wherein the client displays the virtual desktop by a browser;
   receiving a open-file request for opening a target file through the virtual desktop;
   Searching at least one corresponding application service, which is utilized for opening the target file, from among the plurality of the external application services;
   determining if the target file is stored in of the cloud-based system and the at least one external cloud server; and
   determining if the corresponding application service is provided by one of the cloud-based system and the least one external cloud server;
   when the target file is an internal file stored in the cloud-based system and the corresponding application service is provided by the at least one external cloud server, authorizing the corresponding application service provided by the at least one external cloud server to access the target file, driving the at least one external cloud server to provide the corresponding application service for opening the target file after authorized, and displaying the opened target file on the virtual desktop of the client;

wherein a plurality of corresponding application services, each of which is utilized for opening the target file, are searched from among the external application services and the method further comprises:

displaying information of the searched corresponding application services on the virtual desktop of the client, such that a user of the client can select from among the searched corresponding application services.

* * * * *